United States Patent
Suzuki (10) Patent No.: US 8,218,884 B2
(45) Date of Patent: Jul. 10, 2012

(54) IMAGE COMPRESSION APPARATUS AND IMAGE EXPANSION APPARATUS

(75) Inventor: Takayuki Suzuki, Machida (JP)

(73) Assignee: Konica Minolta Business Technologies, Inc. (JP)

(*) Notice: Subject to any disclaimer, the term of this patent is extended or adjusted under 35 U.S.C. 154(b) by 813 days.

(21) Appl. No.: 12/389,254

(22) Filed: Feb. 19, 2009

(65) Prior Publication Data

US 2009/0220161 A1 Sep. 3, 2009

(30) Foreign Application Priority Data

Feb. 28, 2008 (JP) ................................. 2008-047898

(51) Int. Cl.
*G06K 9/36* (2006.01)
(52) U.S. Cl. ....................................................... 382/233
(58) Field of Classification Search .......... 382/232–233, 382/237; 358/1.2, 1.9, 464, 534, 538; 708/203
See application file for complete search history.

(56) References Cited

U.S. PATENT DOCUMENTS

| 6,320,981 | B1 | 11/2001 | Yada |
| 7,372,591 | B2 * | 5/2008 | Sugimoto ............... 358/1.15 |
| 8,040,571 | B2 * | 10/2011 | Yamamizu .............. 358/3.28 |

FOREIGN PATENT DOCUMENTS

JP 11-075069 3/1999

* cited by examiner

*Primary Examiner* — Jose Couso
(74) *Attorney, Agent, or Firm* — Squire Sanders (US) LLP (57) ABSTRACT

An image compression apparatus includes: a dividing section for dividing an image to be compressed into blocks, each of which has a predetermined number of pixels having respective gradation values; a determining section for determining whether the block is a first kind block, in which a number of kinds of gradation values of the predetermined number of pixels belonging to the block is not greater than N (where N is an integer which is equal to 2 or greater) for each block divided and obtained by the dividing section; and a normalizing section which generates one of a first kind compressed data and a second kind of compressed data depending on the result of the determination.

6 Claims, 7 Drawing Sheets

DATA OF IMAGE A AT THE TIME COMPRESSION

ORIGINAL IMAGE DATA OF IMAGE A

| 80 | 70 | 78 | 98 |
|---|---|---|---|
| 60 | 74 | 90 | 68 |
| 71 | 8C | 6B | 65 |
| 7A | 66 | 89 | 82 |

MAX: 98
MIN: 60
DATA KIND: 16>4

MAX: 98
THRESHOLD 1: 91 —— AREA 0
THRESHOLD 2: 8A —— AREA 1
THRESHOLD 3: 83 —— AREA 2
THRESHOLD 4: 7C —— AREA 3
THRESHOLD 5: 75 —— AREA 4
THRESHOLD 6: 6E —— AREA 5
THRESHOLD 7: 67 —— AREA 6
MIN: 60 —— AREA 7

NORMALIZED DATA

| 011 | 101 | 100 | 000 |
|---|---|---|---|
| 111 | 101 | 001 | 110 |
| 101 | 001 | 110 | 111 |
| 100 | 111 | 010 | 011 |

MAX: 98
MIN: 60

COMPRESSED DATA OF IMAGE A

| MAXIMUM VALUE 98 | MINIMUM VALUE 60 | PIXEL 1 011 | PIXEL 2 101 | PIXEL 3 100 | PIXEL 4 000 | PIXEL 5 111 |

| PIXEL 14 111 | PIXEL 15 010 | PIXEL 16 011 |

COMPRESSED DATA OF IMAGE A

| MAXIMUM VALUE 98 | MINIMUM VALUE 60 | PIXEL 1 011 | PIXEL 2 101 | PIXEL 3 100 | PIXEL 4 000 | PIXEL 5 111 | ... | PIXEL 14 111 | PIXEL 15 010 | PIXEL 16 011 |

DATA OF IMAGE A AT THE TIME EXPANSION

NORMALIZED DATA

| 011 | 101 | 100 | 000 |
|---|---|---|---|
| 111 | 101 | 001 | 110 |
| 101 | 001 | 110 | 111 |
| 100 | 111 | 010 | 011 |

MAX: 98
MIN: 60

000; AREA 0 — MAX = REPRESENTATIVE VALUE 0: 98
001; AREA 1 — REPRESENTATIVE VALUE 1: 90
010; AREA 2 — REPRESENTATIVE VALUE 2: 88
011; AREA 3 — REPRESENTATIVE VALUE 3: 80
100; AREA 4 — REPRESENTATIVE VALUE 4: 78
101; AREA 5 — REPRESENTATIVE VALUE 5: 70
110; AREA 6 — REPRESENTATIVE VALUE 6: 68
111; AREA 7 — MIM = REPRESENTATIVE VALUE 7: 60

DATA AFTER EXPANSION

| 80 | 70 | 78 | 98 |
|---|---|---|---|
| 60 | 70 | 90 | 68 |
| 70 | 90 | 68 | 60 |
| 78 | 60 | 88 | 80 |

IMAGE COMPRESSION APPARATUS AND IMAGE EXPANSION APPARATUS

RELATED APPLICATION

This application is based on Japanese Patent Application No. 2008-47898 filed on Feb. 28, 2008 in Japanese Patent Office, the entire content of which is hereby incorporated by reference.

BACKGROUND

1. Field of the Invention

The present invention relates to an image compression apparatus and an image expansion apparatus, which compresses/expands image data, particularly relates to an image compression apparatus and an image expansion apparatus, which compresses/expands image to be compressed by a block unit having a predetermined number of pixels.

2. Description of Related Art

In an image on a sheet, a character area and a photographic area are intermingled in many cases, and when the image on the sheet is evenly compressed/expanded with a compression technology, image quality may greatly deteriorate in a specific area. Then, the image processing apparatus, which discriminates the characteristic of the image per block and switches the compression technology for each block, is proposed (for example, refer to Japanese Patent Application Publication No. H11-75069). In this apparatus, ADCT (Adaptive Discrete Cosine Transform) or BTC compression is selected corresponding to the characteristic of the image for each block as a compression technology.

In order to prevent the degradation of the image quality, it is preferred to switch the compression technology corresponding to the characteristic of the image of each block. However, when information for discriminating the compression technology per block is separately added, the data volume of that portion will increase and reduction of the compression ratio will occur. In the image processing apparatus described in Japanese Patent Application Publication No. H11-75069, when the compression technology is switched, data volume after compression respectively differs and there is a problem that the management of the breaks of the block becomes complicated.

An object of the present invention is to provide an image compression apparatus and an image compression expansion apparatus, which can switch a compression technology corresponding to the characteristic of an image of each block without causing an increase of data volume for discriminating the compression technology to solve the above-mentioned problem.

Further, another object is to provide an image compression apparatus and an image compression expansion apparatus, in which the data volume of compressed data becomes uniform even in a case where the compression technology is switched.

SUMMARY

According to one aspect of the invention, an image compression apparatus includes: a dividing section for dividing an image to be compressed into blocks, each of which has a predetermined number of pixels having respective gradation values; a determining section for determining whether the block is a first kind block, in which a number of kinds of gradation values of the predetermined number of pixels belonging to the block is not greater than N (where N is an integer which is equal to 2 or greater) for each block divided and obtained by the dividing section; and a normalizing section which generates, in a case where a determination result regarding a block for each block being divided and obtained in the dividing section is a first kind block, a first kind compressed data having a first header section having a header, in which the gradation values of the predetermined number of pixels belonging to the divided block is arranged for each kind of the gradation values in either of an ascending order or a descending order, which has been determined in advance, and code data for showing which gradation value of the gradation values arranged in the header a gradation value of the pixel coincides with in respect to the gradation value of each pixel in the block is arranged thereafter, and in cases where a determination result of the determining section is not the first kind block, the normalizing section obtains a maximum value and a minimum value of the number of gradation values of the predetermined number of pixels belonging to the block and generates a second kind of compressed data having a header section in which the minimum value and the minimum value are arranged in an order, which is contrary to the either of an ascending order or a descending order, and code data for showing to which area in M areas (where M is an integer which is greater than N), into which a distribution range having the maximum value and the minimum value as both end value has been divided, the pixel belongs is arranged.

In the above-mentioned invention, in a case where the number of kinds of gradation values of a pixel belonging to a block is equal to or less than N (N is equal to 2 or a greater predetermined integer), N kinds of gradation values are arranged in the header section in a first order (an ascending order or a descending order) and a first kind compressed data, which is expressed with code data for showing which gradation values in the header section each pixel following thereafter coincides with, is generated. On the other hand, in a case where the number of kinds of gradation values of a pixel which belongs to a block, exceeds N kinds, the maximum value and the minimum value of the gradation values in the block are arranged in an ascending or a descending order, which is contrary to the first order, and then, after that generated is a second kind compressed data in which the code data showing that a pixel belongs to which area within M areas (M is greater integer than N), into which a range having the maximum value and the minimum value as its both ends has been divided, is arranged for each pixel in the block.

Whether to be a first compressed data or a second compressed data can be determined by checking that the data arranged in the header section is formed in an ascending order or descending order. Thus, it is not necessary to separately add information, which shows a difference in compression technologies, and an increase in data volume of this portion can be prevented.

According to another aspect of the invention, an image decompression apparatus includes: a discrimination section for determining whether compressed data, the compressed data has been compressed by a block unit having a predetermined number of pixels each of which has respective gradation value, is a first kind compressed data, which expresses each pixel with N gradations (N is a predetermined integer equal to 2 or greater), or a second kind compressed data, which expresses each pixel with M gradations (M is a predetermined integer greater than N) based on whether gradation data is arranged in an ascending order or a descending order in a header section of the compressed data to be expanded; a representative value derivation section, which derives M representative values which normalize a range of gradation values having a maximum value and a minimum value being two gradation values arranged in a head section of the compressed data to M gradations in a case where the discrimination result is the second kind compressed data; and a conversion section, which converts each code data arranged after N gradation values arranged in a header section of the compressed data into a corresponding gradation value in N gradation values arranged in the header section, the gradation value being specified with a value of the code data in a case where a discrimination result of the discrimination section is a first kind compressed data, and converts each code data arranged after the maximum value and the minimum value arranged in the header section of the compressed data into a corresponding value in M representative values drawn by the representative value derivation section, which is specified with a value of the code data in a case where the discrimination result is a second kind compressed data.

According to still other aspect of the invention, an image compression method includes: dividing an image to be compressed into blocks, each of which has a predetermined number of pixels having respective gradation values; determining whether the block is a first kind block, in which a number of kinds of gradation values of the predetermined number of pixels belonging to the block is not greater than N (where N is an integer which is equal to 2 or greater) for each block divided and obtained by the dividing section; generating, in a case where a determination result regarding a block for each block being divided and obtained in the dividing section is a first kind block, a first kind compressed data having a first header section having a header, in which the gradation values of the predetermined number of pixels belonging to the divided block is arranged for each kind in either of an ascending order or a descending order, which has been determined in advance, and code data for showing which gradation value of the gradation values arranged in the header a gradation value of the pixel coincides with in respect to the gradation value of each pixel in the block is arranged thereafter; obtaining, in cases where a determination result of the determining section is not the first kind block, a maximum value and a minimum value of the number of gradation values of the predetermined number of pixels belonging to the block; and generating a second kind of compressed data having a header section in which the minimum value and the minimum value are arranged in an order, which is contrary to the either of an ascending order or a descending order, and code data for showing to which area in M areas (where M is an integer which is greater than N), into which a distribution range having the maximum value and the minimum value as both end value has been divided, the pixel belongs is arranged.

According to still other aspect of the invention, an image compression method includes: determining whether compressed data, the compressed data has been compressed by a block unit having a predetermined number of pixels each of which has respective gradation value, is a first kind compressed data, which expresses each pixel with N gradations (N is a predetermined integer equal to 2 or greater), or a second kind compressed data, which expresses each pixel with M gradations (M is a predetermined integer greater than N) based on whether gradation data is arranged in an ascending order or a descending order in a header section of the compressed data to be expanded; deriving M representative values which normalize a range of gradation values having a maximum value and a minimum value being two gradation values arranged in a head section of the compressed data to M gradations in a case where the discrimination result is the second kind compressed data; converting each code data arranged after N gradation values arranged in a header section of the compressed data into a corresponding gradation value in N gradation values arranged in the header section, the gradation value being specified with a value of the code data in a case where a discrimination result of the discrimination section is a first kind compressed data; and converting each code data arranged after the maximum value and the minimum value arranged in the header section of the compressed data into a corresponding value in M representative values drawn by the representative value derivation section, which is specified with a value of the code data in a case where the discrimination result is a second kind compressed data.

DETAILED DESCRIPTION OF THE PREFERRED EMBODIMENTS

Hereafter, an embodiment of the present invention will be described based on drawings.

Figure 1:
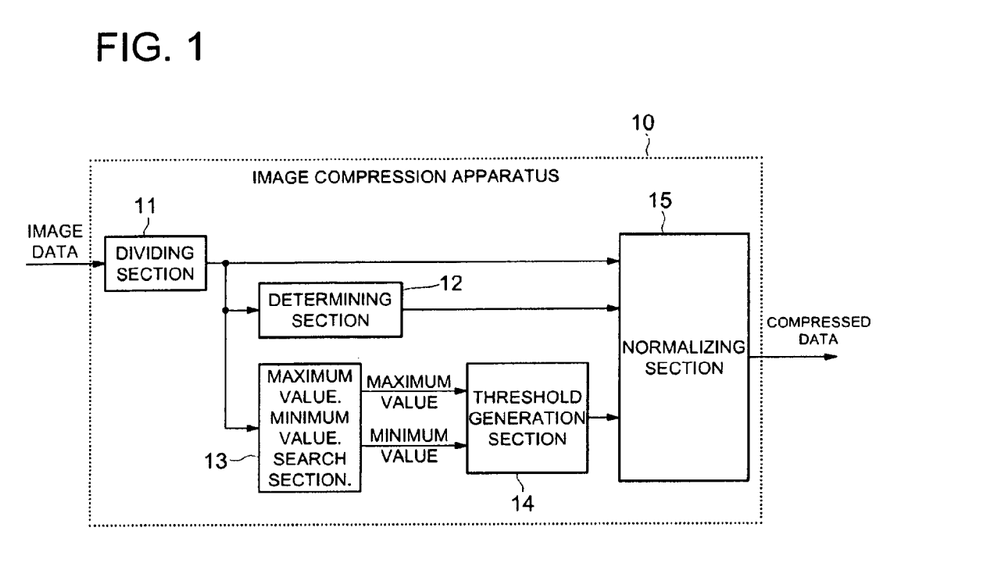
FIG. 1 is a block diagram showing a schematic diagram of an image compression apparatus related to an embodiment of the present invention.
Figure 2:
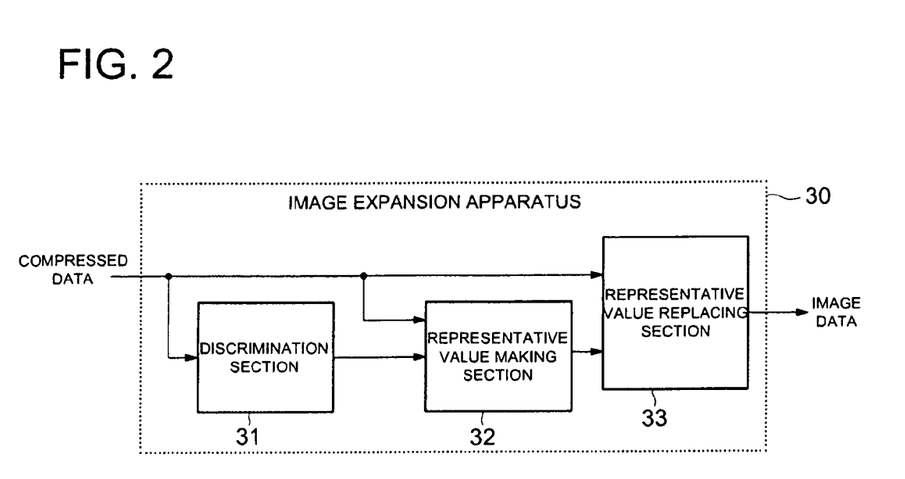
FIG. 2 is a block diagram showing the schematic diagram of an image expansion apparatus related to an embodiment of the present invention.

FIG. 1 shows a structure of an image compression apparatus 10 related to an embodiment of the present invention, and FIG. 2 shows a structure of an image expansion apparatus 30 related to an embodiment of the present invention. The image data of an image to be compressed is inputted to the image compression apparatus 10. This image is divided into blocks, each block of which having a predetermined number of pixels. The image compression apparatus 10 has a function for outputting the compressed data to which each block has been compressed. The image expansion apparatus 30 has a function, which expands the compressed data generated by the image compression apparatus 10.

For example, in a multi-function peripheral (MFP) provided with a copy function and a print function of a document, the image compression apparatus 10 is used for the compression processing at the time of compressing and storing the image data to be inputted into a hard disk drive. The image expansion apparatus 30 is used in order to expand the compressed data read from the hard disk drive at the time of outputting the image.

The image compression apparatus 10 and the image expansion apparatus 30 are configured by hardware circuits, such as a sequencer and a logic circuit, each of which includes a micro-program. It may be realized by executing a predetermined program in computer apparatus provided with a CPU (Central Processing Unit), a ROM (Read Only Memory) and a RAM (Random Access Memory).

The compression technology used with the image compression apparatus 10 and the image expansion apparatus 30 is based on BTC compression. The image data, which is inputted into the image compression apparatus 10, is image data having a bitmap form that expresses 1 pixel with 8-bit-deep gradation being 256 gradations. The image data after the expansion, which is outputted from the image expansion apparatus 30, also has the same data format.

The image compression apparatus 10 is configured by a dividing section 11, a determining section 12, a maximum value and minimum value search section 13, a threshold generation section 14, and a normalizing section 15.

Figure 3:
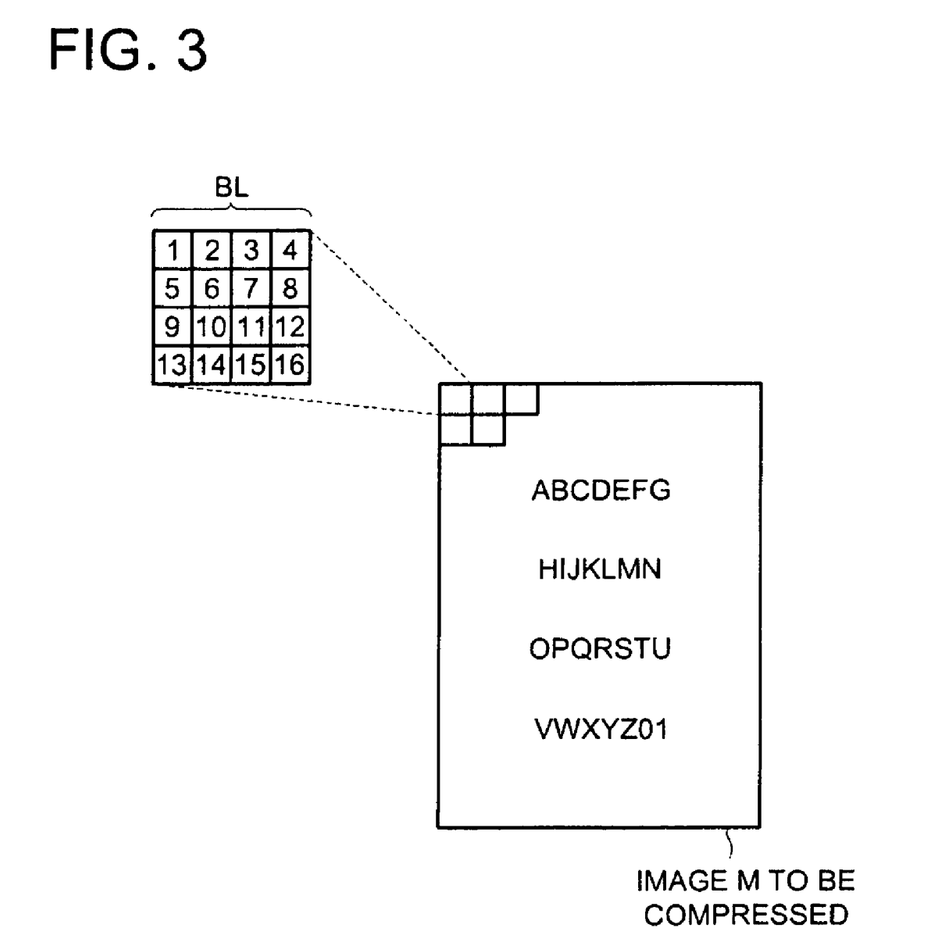
FIG. 3 is an explanatory view imitationally showing the aspect in which an image to be compressed is divided into blocks.

The dividing section 11 divides the inputted image data to be compressed into blocks, each of which has a predetermined number of pixels. Here, as shown in FIG. 3, the image is divided into blocks BL (4 pixels×4 pixels) as the upper left of an image M being a base point. Whenever the dividing section 11 divides the image data into 1 block, the dividing section 11 sends out the image data of the block to the determining section 12, the maximum value and minimum value search section 13, and the normalizing section 15.

The determining section 12 determines whether the number of the kinds of gradation value of the pixel belonging to the block divided and obtained by the dividing section 11 (the block to be processed, which was inputted from the dividing section 11) is a first kind block having equal to or less than N kinds of gradation values (N is an predetermined integer not less than 2) for every block obtained by the dividing section 11. Here, the value of N is set at "4". The determining section 12 sends out a judgment signal, which shows whether it is the first kind block, the data for showing the gradation values having not more than detected N kinds gradation values (these are called representative value) in case where it is the first kind block, and its number of kinds of gradations to the normalizing section 15.

The maximum value and minimum value search section 13 has a function for obtaining the maximum value and minimum value of the gradation values that belong to the block (the block inputted from the dividing section 11) for every block, which has been divided and obtained by the diving section 11. For example, by sequentially comparing the gradation values of each pixel of the block to be processed, the maximum value and the minimum value in the block are searched. The data showing the maximum value and the minimum value, which are search results, is sent to a threshold generation section 14.

The threshold generation section 14 generates thresholds for dividing a distribution range of the gradation values having the maximum value and the minimum value as both ends of gradation values inputted from the maximum value and minimum value search section 13 into M areas (M is a predetermined integer greater than N). Here, the value of M is set at "8". In a case where M is "8", thresholds 1-7 are generated. It is considered that the arrangement order of threshold 1, threshold 2, and threshold 3 - - - is an order arranged with the larger threshold first. Each generated threshold is sent to the normalizing section 15.

The normalizing section 15 compresses the image data of the block into the first kind compressed data for every block divided and obtained by the dividing section 11 in a case where the decision result of the determining section 12 is the first kind block with respect to the block (block to be processed, which has been inputted from the dividing section 11). In a case where a decision result is not the first kind block, the image data of the block is compressed into a second kind compressed data.

In detail, whether the block is the first kind block is determined based on the judgment signal inputted from the determining section 12. In the case of the first kind block, the gradation value of the pixel, which belongs to the block, is arranged in the header section in either of an ascending order or a descending order determined in advance, (it is considered as a the first order) with one gradation value per kind. The first kind compressed data in which the code data for showing that the gradation value of the pixel coincides with which gradation values within gradation values is arranged with respect to each pixel in the block after that is generated. Each gradation value arranged in the header section uses the representative value sent from the determining section 12.

Here, the first order is to be an ascending order. In addition, although it is a case where the number of kinds of the representative value of the pixel belonging to this block is less than N, the representative values of N kinds are arranged in the header section of the compressed data by adding dummy data. The dummy data use arbitrary values, which are different from the representative values received from determining section 12.

The number of bits of the code data is set into the minimum number of bits, which can express N kinds. Here, since it is N=4, 2 bits is used. The value of code data has been determined so as to indicate the arrangement ranking in the corresponding header section of the compressed data of the representative value to be a reverse order. That is, code data "00" indicates that it corresponds to the representative value arranged in the 4th byte (N-th byte), code data "01" indicates that it corresponds to the representative value arranged in the 3rd byte ((N−1)th byte), code data "10" indicates that it corresponds to the representative value arranged in the 2nd byte ((N−2)th byte), and code data "11" indicates that it corresponds to the representative value arranged in the 1st byte ((N−3)th byte). As long as the correspondence relation between the value of the code data and the arrangement ranking is 1 to 1, it may follow other rules. However, the rules should be determined in common across the image compression apparatus 10 and the image expansion apparatus 30.

The normalizing section 15 detects a coincided representative value by comparing the gradation value of the pixel to be normalized with each representative value. The code data corresponding to the representative value is assigned to the pixel. The code data following the representative value in the compressed data is arranged in the numerical order given to each pixel in the block BL in FIG. 3. That is, the code data is arranged so that the order sequentially moves toward the pixel of the right-hand side in the same line from the pixel of the upper left in the block, and when the right end is reached, the code data will be arranged corresponding to an order of moving to the left end of the line downward by one, and moving to the right-hand side in the same line.

In a case where the determination result of determining section 12 is not the first kind block, the maximum value and the minimum value of the gradation values of the pixels, which belong to the block, are calculated. This maximum value and the minimum value are arranged to the header section in the second order, which is a reverse order of the first order (it is a descending order if the first order is an ascending order, and it is an ascending if the first order is a descending order). After that, generated is a second kind compressed data in which code data, which shows which area a pixel belongs to within areas that was formed by dividing the distribution range of the gradation values having the maximum value and the minimum value as its both ends into M areas (M is greater integer than N), is arranged for each pixel in the block. The code data, which continues after the maximum value and the minimum value in the compressed data, is arranged in the numerical order given to each pixel in the block BL in FIG. 3 as well as the case of the first kind compressed data.

Here, since the arrangement order (the first order) of the representative value in the first kind compressed data was made into the ascending order, an arrangement order (the second order) of the maximum value and the minimum value in the second kind compressed data is made into a descending order. Since M is "8", in the second kind compressed data, the code data per pixel is 3 bits, which is the minimum number of bits that can express eight kinds of values.

To which area within the M areas each pixel belong is determined by comparing the gradation value of the pixel to be normalized and each of the threshold values 1-7 inputted from the threshold generation section 14. Here, the area and the code data corresponding to the area will be given as following. When the gradation value of a pixel is set to "D", and the maximum value≦D>threshold, then the area is 0, and the code data is "000". When threshold 1≦D>threshold 2, then, area is 1 and code data is set as "001". When threshold 2≦D>threshold 3, then, area is 2 and code data is set as "010". When threshold 3≦D>threshold 4, then, area is 3 and code data is set as "011". When threshold 4≦D>threshold 5, then, area is 4 and code data is set as "100". When threshold 5≦D>threshold 6, then, area is 5 and code data is set as "101". When threshold 6≦D>threshold 7, then, area is 6 and code data is set as "110". When threshold 7≦D>the minimum value, then, area is 7 and code data is set as "111".

1 block is configured by 16 pixels, N=4 and M=8 are set and 1 pixel is expressed with 2-bit code data in the first kind compressed data by 2-bit code data. 1 pixel is expressed with 3-bit code data in the second kind compressed data. Since the maximum value, the minimum value and the representative value are respectively expressed by 1 byte, the data size for 1 block in the first kind compressed data and the data size for 1 block in the second kind compressed data are the same, which is 8 bytes. That is, the values of M and N are selected corresponding to the number of pixels of 1 block so that the data volume of the compressed data for 1 block for the first kind compressed data and the second kind compressed data block may become the same.

Next, the image expansion apparatus 30 will be explained. As shown in FIG. 2, the image expansion apparatus 30 is provided with a discrimination section 31, a representative value making section 32 and a representative value replacing section 33.

The discrimination section 31 determines whether the compressed data is the first kind compressed data that expresses each pixel with N gradation values, or the compressed data is the second kind compressed data that expresses each pixel with M gradation values based on the fact that the data showing the gradation values is arranged in an ascending order or a descending order in the header section of the inputted compressed data to be compressed. The kind signal, which shows the determination result, is sent to the representative value making section 32. The kind signal inputted from the discrimination section 31 is outputted to the representative value replacing section 33 as it is.

Here, a large and small comparison of the value of the 1st byte and the value of the 2nd byte of the header section of the compressed data is performed. When it is in an ascending order (the first order, 1st byte value>2nd byte value), it will be determined that the compressed data is the first kind compressed data. When it is in a descending order (the second order: 2nd byte value>1st byte value), it will be determined that the compressed data is the second kind compressed data.

In a case where the kind signal inputted from the discrimination section 31 indicates the first kind compressed data, the representative value making section 32 outputs N representative values arranged in the header section of compressed data to the representative value replacing section 33 as representative values for converting each code data into a gradation value. Here, the 1st representative value in the header section is outputted as a representative value 3, the 2nd representative value in the header section is outputted as a representative value 2, the 3rd representative value in the header section is outputted as a representative value 2, the 4th representative value in the header section is outputted as a representative value 0 to representative value replacing section 33.

In a case where the kind signal inputted from the discrimination section 31 indicates the second kind compressed data (it is not the first kind compressed data), M representative values for normalizing the range having two gradation values arranged in the header section of the compressed data as the maximum value and the minimum value into M gradations are derived. Here, the 1st byte of the header section of the second kind compressed data shows the maximum value, and the 2nd byte shows the minimum value. The representative value making section 32 calculates (N−2) boundary values for equally dividing the range having the maximum value and the minimum value as its both ends into M areas. Then, the maximum value is set to a representative value 0, the largest value among the calculated boundary values is set to a representative value 1, the next larger boundary value is set a representative value 2, the next larger boundary value is set a representative value 3, the next larger boundary value is set a representative value 4, the next larger boundary value is set a representative value 5, the next larger boundary value is set a representative value 6 and the minimum value is set a representative value 7. Such representative values 0-7 are outputted to the representative value replacing section 33.

In a case where the kind signal inputted from the representative value making section 32 indicates the first kind compressed data, the representative value replacing section 33 recognizes that the code data of the compressed data begin from the 5th byte (after the N representative values) of the compressed data, and that the number of bits of code data per pixel is 2 bits. And each code data located in every 2 bits existing after the 5th byte of compressed data to be expanded are converted into image data of the same value as a representative value arranged according to the arrangement ranking corresponding to the value of the code data. That is, when the value of code data is "00", it will convert into image data having the same value as the representative value 3 arranged at the 4th byte from the top of the compressed data, when the value of code data is "01", it will convert into image data having the same value as the representative value 2 arranged at the 3rd byte from the top of the compressed data. When the value of code data is "10", it will convert into image data having the same value as the representative value 1 arranged at the 2nd byte from the top of the compressed data. Then, when the value of code data is "11", it will convert into image data having the same value as the representative value 0 arranged at the 1st byte from the top of the compressed data.

The code data contained in the compressed data for 1 block are arranged in the order of the arrangement in the compressed data according to the numerical order in the block BL in FIG. 3. That is, the pixels will be arranged in the order, which starts from the pixel of the upper left in the block to the pixel on the next right-hand side in the same line. When the right end is reached, the pixel will be arranged in the order, which starts from a pixel at the left end of one line below to the pixel on the right hand side. Then image data for one block will be reproduced.

In a case where the kind signal inputted from the representative value making section 32 indicates the second kind compressed data, the representative value replacing section 33 recognizes that the code data of the compressed data begins from the 3rd (back of the maximum value and the minimum value) byte, and that the number of bits of the code data per pixel is 3 bits. And each code data in every 3 bits following the maximum value and the minimum values contained in the compressed data, which will be expanded, are converted into image data having the same value as the representative value corresponding to the value of the code data within the representative values inputted from the representative value making section 32.

That is, when code data is "000", the compressed data is converted to a representative value 0, when code data is "001", the compressed data is converted to a representative value 1, when code data is "010", the compressed data is converted to a representative value 2, when code data is "011", the compressed data is converted to a representative value 3, when code data is "100", the compressed data is converted to a representative value 4, when code data is "101", the compressed data is converted to a representative value 5, when code data is "110", the compressed data is converted to a representative value 6 and when code data is "111", the compressed data is converted to a representative value 7.

The code data contained in the compressed data of 1 block is arranged in the order of the arrangement in the compressed data according to the numerical order in the block BL in FIG. 3. This is the same as that of a case where the first compressed data is expanded.

Figure 4:
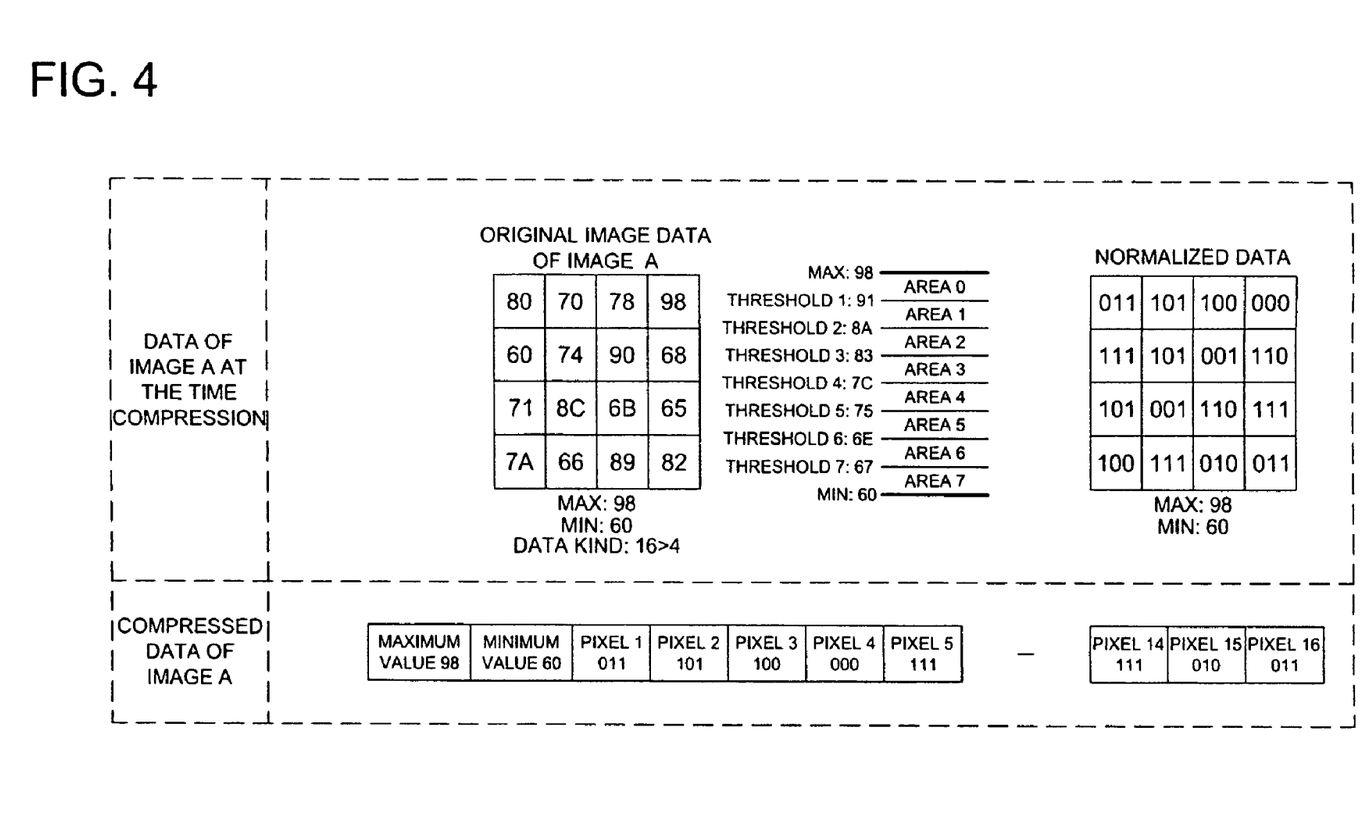
FIG. 4 is an explanatory view showing various kinds of data in the case of compressing the original image data of image A (a photographic image) using an image compression apparatus.

Next, an example of compression by the image compression apparatus 10 will be described. FIG. 4 illustrates various data at the time of compressing an image A with the image compression apparatus 10. The gradation value is expressed by a hexadecimal number. The image A is an image, which has been read and acquired by scanning a photograph by a scanner, and there are many kinds of data (gradation values) in a block. The searched results of the number of gradation values (data) contained in a block conducted by the determining section 12 are 16. Since this is greater than default value N=4, this block is determined to be the second kind block.

When the maximum value and the minimum value in this block are searched by the maximum value and minimum value search section 13, the maximum value will be set to 98h and the minimum value will be set to 60h. In the threshold generation section 14, thresholds 1-7, which equally divide the gradation range of between the maximum value and the minimum values into M=8 areas, will be generated. The normalizing section 15 compares gradation values of each pixel of the original image data, determines to which area each pixel belongs by comparing the value (data) with threshold 1-threshold 7 and respectively generates the 3-bit code data (normalized data) corresponding to the areas. Since with respect to the kind of gradation value (data), default value is N=4, and this block is the first kind block, the maximum value and the minimum value are arranged in this large and small order at the header of the compressed data. The 3-bit code data (normalized data) corresponding to each pixel of the pixels 1-16 is arranged after that.

Figure 5:
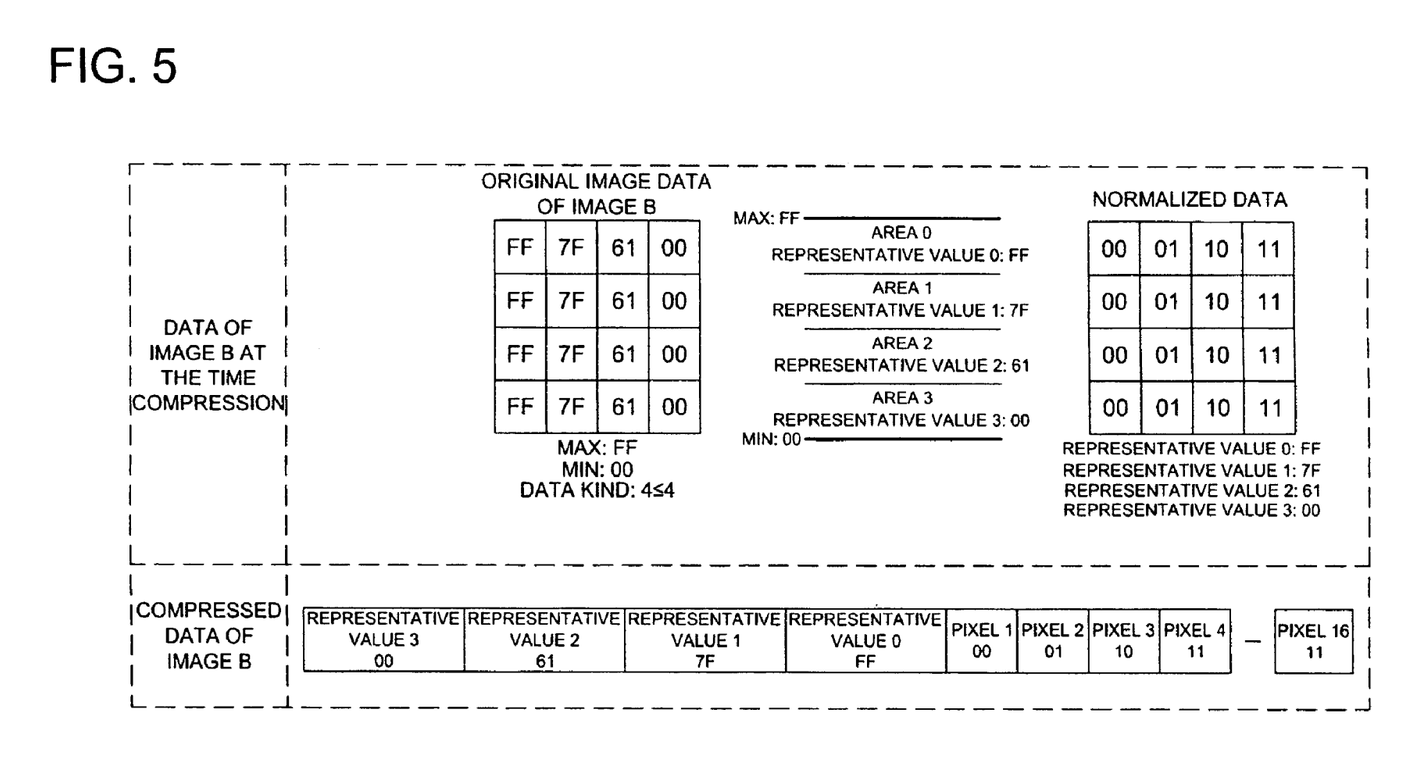
FIG. 5 is an explanatory view showing various kinds of data in the case of compressing the original image data of image B (a character image) using an image compression apparatus.

FIG. 5 illustrates various data at the time of compressing an image B using the image compression apparatus 10. The image B is the document data created with a personal computer. The kinds of the gradation values (data) contained in a block are few.

The result, which is obtained by searching the gradation values (data) contained in a block using the determining section 12, is 4. Since this is N=4 or lower default value, this block is determined to be the first kind block.

The determining section 12 sends out the determination result, the number of kinds of gradation values (this example 4), data FFh, 7Fh, 61h and 00h, each of which show each gradation value, (representative value) to the normalizing section 15. The normalizing section 15 determines with which representative value within the values (data) of FFh, 7F, 61h and 00h, the gradation values (data) of each pixel in the block coincide. The gradation values are coded into the code data corresponding to the coincided representative value. Four kinds of representative values included in a block are arranged in the header section of the compressed data. At this time, it is sequentially arranged in the order, which starts from the representative value having a small value.

Figure 6:
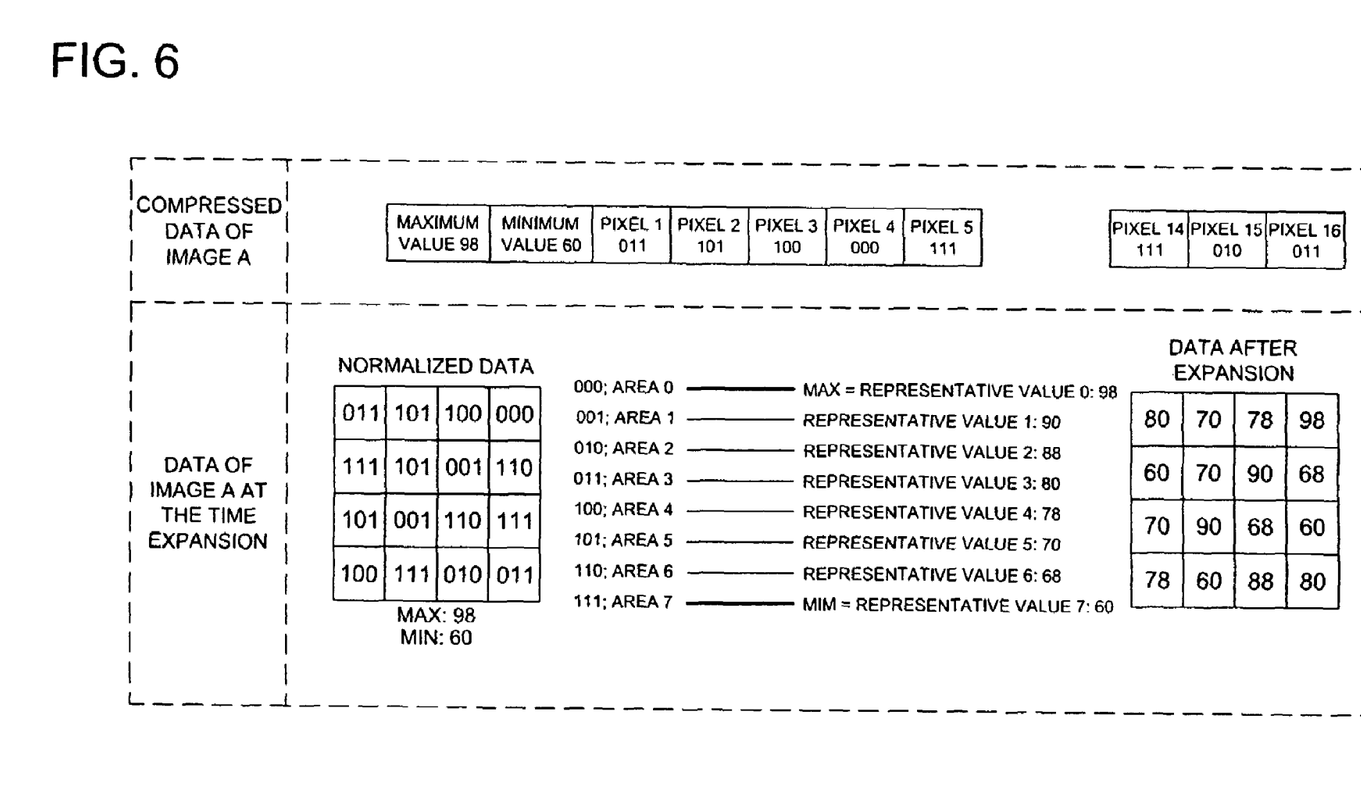
FIG. 6 is an explanatory view showing various kinds of data in the case of expanding the compressed data of image A using an image expansion apparatus.

FIG. 6 illustrates various data in a case of expanding the compressed data of an image A. The discrimination section 31 compares the 2 bytes of header section of the compressed data in terms of large and small. Since the 1st byte is larger than the 2nd byte, it is determined to be the second kind compressed data. It is recognized as the top 1st byte of the compressed data to be the maximum value, the 2nd byte to be the minimum value and the data thereafter to be normalized data having 3 bits. The determination result is sent to the representative value making section 32. The representative value making section 32 generates six representative values 1-6, which equally divide the range between this maximum value and minimum values into equal parts using the maximum value and the minimum value included in the compressed data. The maximum value is set to a representative value 0, and the minimum value is set to a representative value 7. Such representative values are sent to the representative value replacing section 33 to replace the code data (normalized data) and restore the image.

Figure 7:
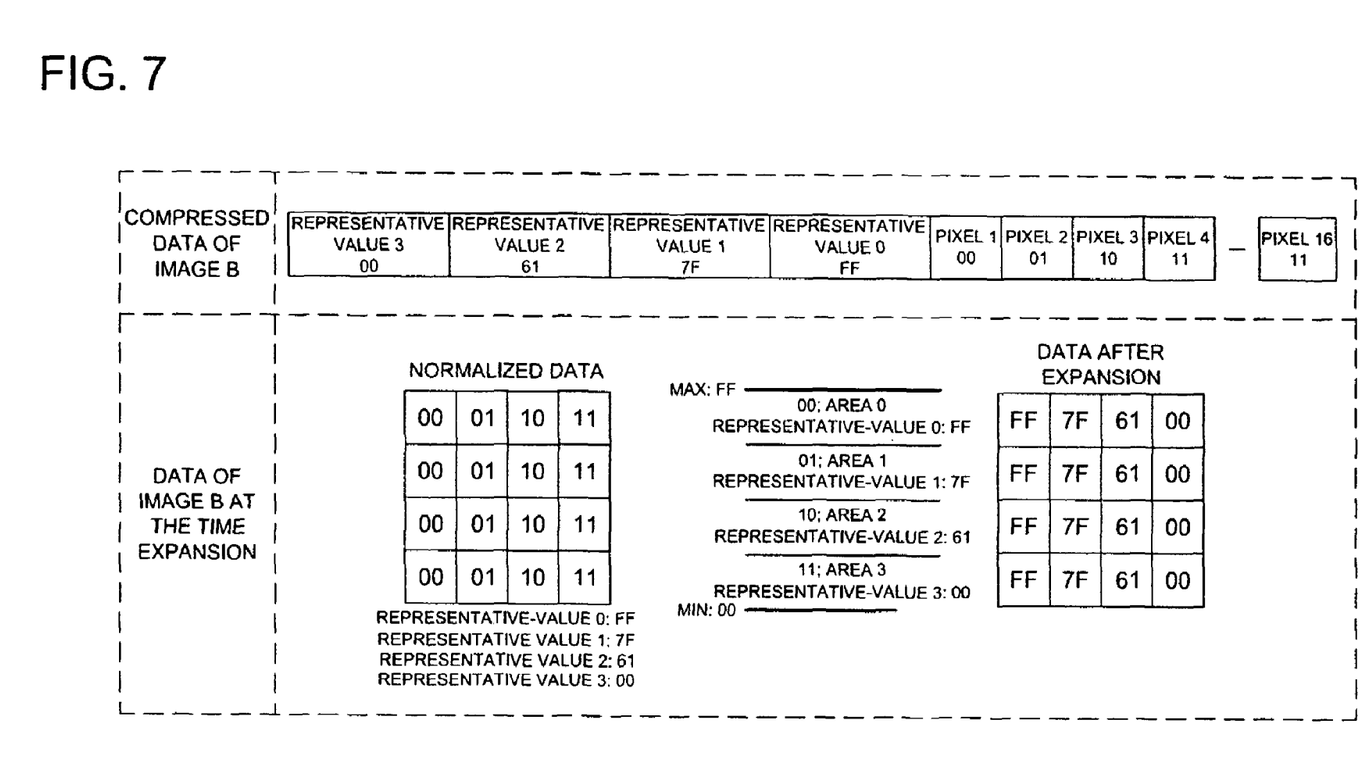
FIG. 7 is an explanatory view showing various kinds of data in the case of expanding the compressed data of image B using an image expansion apparatus.

FIG. 7 illustrates various data in a case of expanding the compressed data of image B. Large and small comparison of 2 bytes of the top of the compressed data is performed by the discrimination section 31. Since the 1st byte is smaller than the 2nd byte, it is determined that it is a first kind compressed data, and the determination result is sent to the representative value making section 32. The representative value making section 32 sets the top representative value to the representative value 3, the 2nd byte to the 2nd representative value, the 3 byte to the representative value 1 and the 4th byte to the representative 0, and sends them to the representative value replacing section 33. The representative value replacing sections 33 determines that the 4th byte and onward of the code are code data having a pixel of 2 bits per pixel. The representative value replacing section 33 restores an image by replacing the code data of each pixel to corresponding representative values.

In the above, embodiments of the present invention have been explained by using drawings. A concrete structure is not limited to what was shown in those embodiments. It will be contained in the present invention although there are changes and additions in a range, which does not depart from the scope of the present invention.

For example, either of the first order or the second order may be an ascending order or a descending order. What is necessary is to set the same rule between the image compression apparatus 10 and the image expansion apparatus 30. As long as the correspondence relation between the arrangement order of the code data within each compressed data and the pixel position in a block is identically fixed across the image compression apparatus 10 and the image expansion apparatus 30, it may be arbitrarily set up.

The case where in the first kind compressed data, code data per pixel has been set with 2 bits, and in the second kind compression data, code data per pixel has been set with 3 bits were described and illustrated. However, when there is more number of bits in the second kind compressed data than the number of bits in the first kind compressed data, the number of bits for each kind will not be limited to what was illustrated. Two kinds of arbitrary numbers of bits selected from the arbitrary numbers of bits smaller than the number of bits of 1 pixel of the original image data may be sufficient.

In addition, size of 1 block is not limited to what was illustrated in embodiments examples above.

What is claimed is:

1. An image compression apparatus comprising:
a dividing section for dividing an image to be compressed into blocks, each of which has a predetermined number of pixels having respective gradation values;
a determining section for determining whether the block is a first kind block, in which a number of kinds of gradation values of the predetermined number of pixels belonging to the block is not greater than N (where N is an integer which is equal to 2 or greater) for each block divided and obtained by the dividing section; and
a normalizing section which generates, in a case where a determination result regarding a block for each block being divided and obtained in the dividing section is a first kind block, a first kind compressed data having a first header section having a header, in which the gradation values of the predetermined number of pixels belonging to the divided block is arranged for each kind of the gradation values in either of an ascending order or a descending order, which has been determined in advance, and code data for showing which gradation value of the gradation values arranged in the header a gradation value of the pixel coincides with in respect to the gradation value of each pixel in the block is arranged thereafter, and in cases where a determination result of the determining section is not the first kind block, the normalizing section obtains a maximum value and a minimum value of the number of gradation values of the predetermined number of pixels belonging to the block and generates a second kind of compressed data having a header section in which the minimum value and the minimum value are arranged in an order, which is contrary to the either of an ascending order or a descending order, and code data for showing to which area in M areas (where M is an integer which is greater than N), into which a distribution range having the maximum value and the minimum value as both end value has been divided, the pixel belongs is arranged.

2. The image compression apparatus of claim 1, wherein the number of bits of code data per pixel in the first kind of compressed data is set into the minimum number of bits, which can express N kinds; the number of bits of code data per pixel in the second kind of compressed data is set into the minimum number of bits, which can express M kinds; and values of M and N are set so that the number of bits of code data per pixel in the first kind of compressed data is smaller than the number of bits of code data per pixel in the second kind of compressed data.

3. The image compression apparatus of claim 1, wherein values of M and N are set so that a data volume of the first kind of compressed data for the divided block and a data volume of the second kind compressed data block become the same.

4. An image decompression apparatus comprising:
a discrimination section for determining whether compressed data, the compressed data has been compressed by a block unit having a predetermined number of pixels each of which has respective gradation value, is a first kind compressed data, which expresses each pixel with N gradations (N is a predetermined integer equal to 2 or greater), or a second kind compressed data, which expresses each pixel with M gradations (M is a predetermined integer greater than N) based on whether gradation data is arranged in an ascending order or a descending order in a header section of the compressed data to be expanded;
a representative value derivation section, which derives M representative values which normalize a range of gradation values having a maximum value and a minimum value being two gradation values arranged in a head section of the compressed data to M gradations in a case where the discrimination result is the second kind compressed data; and
a conversion section, which converts each code data arranged after N gradation values arranged in a header section of the compressed data into a corresponding gradation value in N gradation values arranged in the header section, the gradation value being specified with a value of the code data in a case where a discrimination result of the discrimination section is a first kind compressed data, and converts each code data arranged after the maximum value and the minimum value arranged in the header section of the compressed data into a corresponding value in M representative values drawn by the representative value derivation section, which is specified with a value of the code data in a case where the discrimination result is a second kind compressed data.

5. An image compression method comprising:
dividing an image to be compressed into blocks, each of which has a predetermined number of pixels having respective gradation values;
determining whether the block is a first kind block, in which a number of kinds of gradation values of the predetermined number of pixels belonging to the block is not greater than N (where N is an integer which is equal to 2 or greater) for each block divided and obtained by the dividing section;
generating, in a case where a determination result regarding a block for each block being divided and obtained in the dividing section is a first kind block, a first kind compressed data having a first header section having a header, in which the gradation values of the predetermined number of pixels belonging to the divided block is arranged for each kind in either of an ascending order or a descending order, which has been determined in advance, and code data for showing which gradation value of the gradation values arranged in the header a gradation value of the pixel coincides with in respect to the gradation value of each pixel in the block is arranged thereafter;
obtaining, in cases where a determination result of the determining section is not the first kind block, a maximum value and a minimum value of the number of gradation values of the predetermined number of pixels belonging to the block; and
generating a second kind of compressed data having a header section in which the minimum value and the minimum value are arranged in an order, which is contrary to the either of an ascending order or a descending order, and code data for showing to which area in M areas (where M is an integer which is greater than N), into which a distribution range having the maximum value and the minimum value as both end value has been divided, the pixel belongs is arranged.

6. An image decompression method comprising:

determining whether compressed data, the compressed data has been compressed by a block unit having a predetermined number of pixels each of which has respective gradation value, is a first kind compressed data, which expresses each pixel with N gradations (N is a predetermined integer equal to 2 or greater), or a second kind compressed data, which expresses each pixel with M gradations (M is a predetermined integer greater than N) based on whether gradation data is arranged in an ascending order or a descending order in a header section of the compressed data to be expanded;

deriving M representative values which normalize a range of gradation values having a maximum value and a minimum value being two gradation values arranged in a head section of the compressed data to M gradations in a case where the discrimination result is the second kind compressed data;

converting each code data arranged after N gradation values arranged in a header section of the compressed data into a corresponding gradation value in N gradation values arranged in the header section, the gradation value being specified with a value of the code data in a case where a discrimination result of the discrimination section is a first kind compressed data; and converting each code data arranged after the maximum value and the minimum value arranged in the header section of the compressed data into a corresponding value in M representative values drawn by the representative value derivation section, which is specified with a value of the code data in a case where the discrimination result is a second kind compressed data.

* * * * *